(12) United States Patent
Shabot et al.

(10) Patent No.: US 10,710,412 B2
(45) Date of Patent: Jul. 14, 2020

(54) WHEEL

(71) Applicant: The Stanley Works Israel Ltd., Rosh Ha'Ayin (IL)

(72) Inventors: Jacob Shabot, Ramt-Gan (IL); Nir Evron, Yehud-Monoson (IL); Abraham Faibish, Jerusalem (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 394 days.

(21) Appl. No.: 15/591,500

(22) Filed: May 10, 2017

(65) Prior Publication Data

US 2018/0326785 A1    Nov. 15, 2018

(51) Int. Cl.
*B60C 7/24*   (2006.01)
*B29C 45/14*  (2006.01)
*B60B 3/00*   (2006.01)
*B60B 5/02*   (2006.01)
*B29D 30/02*  (2006.01)
(Continued)

(52) U.S. Cl.
CPC ............ *B60C 7/24* (2013.01); *B29C 45/1459* (2013.01); *B29C 45/14467* (2013.01); *B29D 30/02* (2013.01); *B60B 3/001* (2013.01); *B60B 3/10* (2013.01); *B60B 5/02* (2013.01); *B60C 7/12* (2013.01); *B29K 2021/003* (2013.01); *B29K 2623/12* (2013.01); *B60B 2310/204* (2013.01); *B60B 2310/316* (2013.01); *B60B 2310/321* (2013.01); *B60B 2320/10* (2013.01); *B60B 2360/32* (2013.01); *B60B 2360/322* (2013.01); *B60B 2360/50* (2013.01); *B60B 2900/131* (2013.01); *B60B 2900/313* (2013.01); *B60C 2007/005* (2013.01)

(58) Field of Classification Search
CPC .... B60C 7/00; B60C 7/12; B60C 7/24; B60B 3/001; B60B 3/10; B60B 7/01; B29C 45/14467; B29C 45/1459; B29D 30/02
See application file for complete search history.

(56) References Cited

U.S. PATENT DOCUMENTS 8,689,845 B2 * 4/2014 Morris ............... B29C 45/1657
                                                    152/323
10,052,832 B2 * 8/2018 Andrews ............... B29D 30/02
(Continued)

FOREIGN PATENT DOCUMENTS

DE        9101831        7/1991
DE        9302974 U1 *   9/1993 ............. B60B 3/002

*Primary Examiner* — Kip T Kotter
(74) *Attorney, Agent, or Firm* — Bruce S. Shapiro

(57) ABSTRACT

A wheel includes a main hub portion having outer and inner portions, the inner portion being spaced from the outer portion by a main hub sidewall; a ring portion configured to engage the main hub portion so as to enclose the outer portion and the inner portion and create an enclosed void; and an exterior covering surrounding at least part of the main hub portion and the ring portion at the enclosed void. A method of forming a wheel includes forming a main hub portion having an outer portion and an inner portion; forming a ring portion configured to engage the main hub portion so as to enclose the outer portion and the inner portion and create an enclosed void; assembling the main hub portion and the ring portion into an assembled hub; and overmolding an exterior covering surrounding at least part of the main hub and ring portions.

17 Claims, 7 Drawing Sheets

(51) Int. Cl.
    *B60B 3/10*     (2006.01)
    *B60C 7/12*     (2006.01)
    *B29K 21/00*     (2006.01)
    *B29K 623/00*     (2006.01)
    *B60C 7/00*     (2006.01)

(56) References Cited

U.S. PATENT DOCUMENTS

| | | | |
|---|---|---|---|
| 2005/0185907 A1* | 8/2005 | Byren | G02F 1/3538 |
| | | | 385/125 |
| 2010/0052412 A1 | 3/2010 | Morris | |
| 2012/0001478 A1* | 1/2012 | Zuchoski | B62D 55/14 |
| | | | 305/137 |
| 2014/0201942 A1 | 7/2014 | Irfan | |

\* cited by examiner

WHEEL

FIELD OF THE INVENTION

The present invention relates generally to wheels.

BACKGROUND OF THE INVENTION

The general concept of the wheel has been known since antiquity, and has evolved from wood, to metal and composites. Coverings for wheels were also developed over time. For example, where the oldest wheels were formed of wood or metal that made direct contact with the ground, leather and eventually rubber were added to the circumference of the wheel to dampen transmission of impact forces as the wheel traverses irregular terrain or surface debris. Heavier load products (e.g., bikes, heavier duty wheelbarrows, and cars) typically have wheels utilizing air-filled inflated tires. Lighter load products (e.g., suitcases, carts, and mobile toolboxes) typically utilize casters or wheels of simpler construction, such as being formed from metal, plastic, rubber, or a simple combination thereof.

Among other things, the present application relates to an improved molded wheel.

SUMMARY OF THE INVENTION

According to one aspect of this disclosure, a wheel includes a main hub portion having an outer portion and an inner portion, the inner portion being spaced from the outer portion by a main hub sidewall. The wheel also includes a ring portion configured to engage the main hub portion so as to enclose the outer portion and the inner portion and create an enclosed void between the main hub portion and the ring portion. The wheel further includes an exterior covering surrounding at least part of the main hub portion and the ring portion at the enclosed void.

According to another aspect of this disclosure, a method of forming a wheel includes forming a main hub portion having an outer portion and an inner portion, the inner portion being spaced from the outer portion by a main hub sidewall. The method also includes forming a ring portion configured to engage the main hub portion so as to enclose the outer portion and the inner portion and create an enclosed void between the main hub portion and the ring portion. The method additionally includes assembling the main hub portion and the ring portion into an assembled hub. The method further includes overmolding an exterior covering surrounding at least part of the main hub portion and the ring portion of the assembled hub.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of wheels in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1:
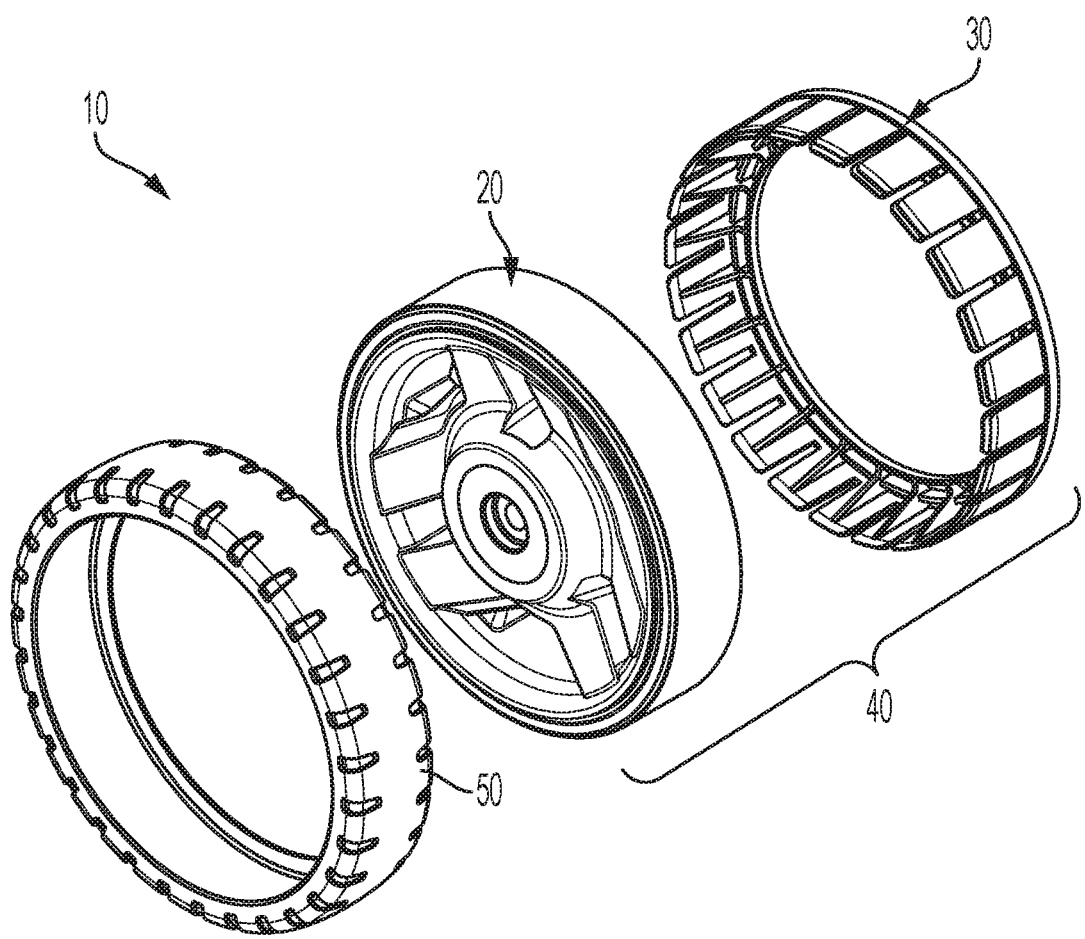
FIG. 1 illustrates an exploded front perspective view of a wheel according to an aspect of the present disclosure.
Figure 2:
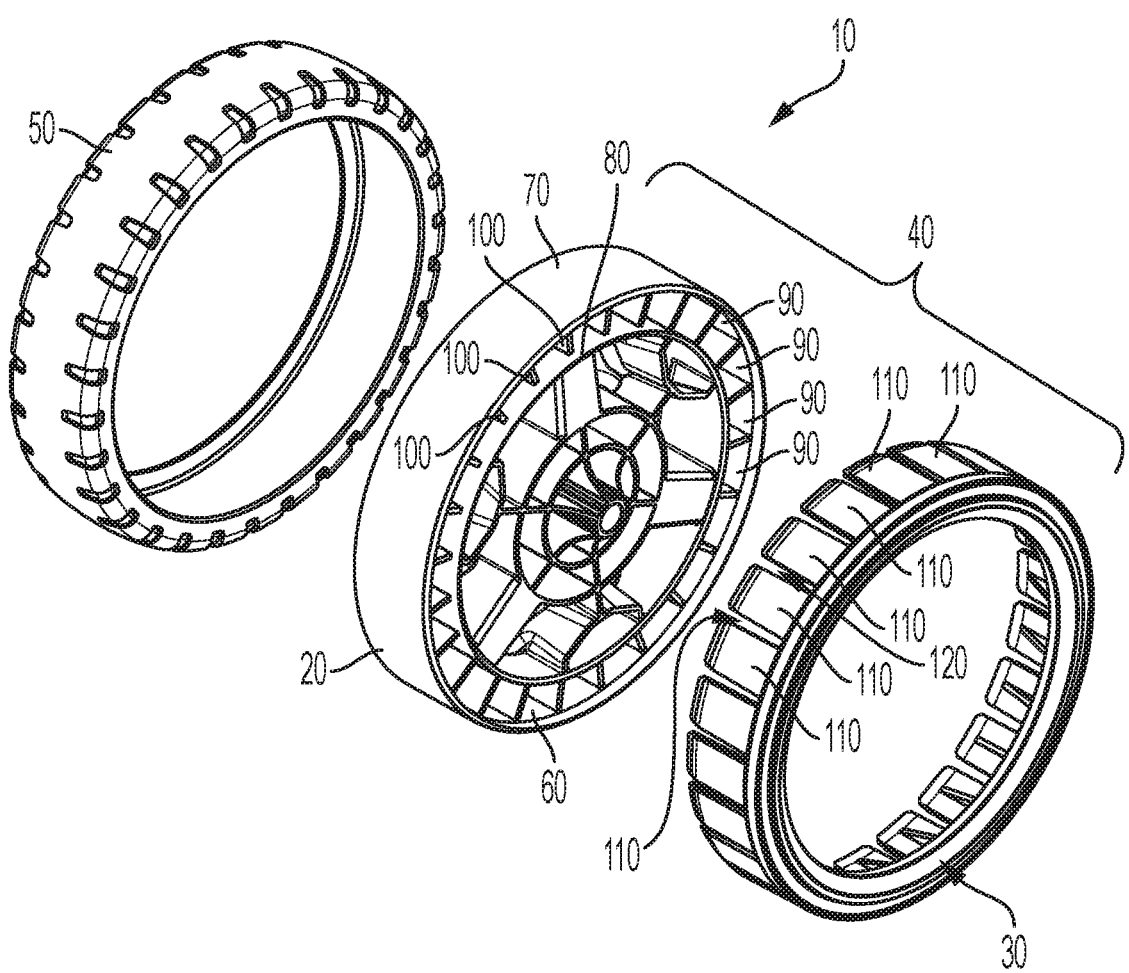
FIG. 2 illustrates an exploded back perspective view of the wheel of FIG. 1.

FIGS. 1 and 2 illustrate opposing perspective views of wheel 10 of the present disclosure in exploded form. As shown, wheel 10 includes a main hub portion 20 configured to receive therein a ring portion 30 to form an assembled hub 40 as described in greater detail below. As further described below, the assembled hub 40 may be configured to receive thereon an exterior covering 50.

As may be appreciated from FIG. 2, the main hub portion 20 may include a space 60 therein defined between an outer portion 70 and an inner portion 80 (outer and inner being relative to an axis of rotation for the wheel 10). In an embodiment, the space 60 may be segmented into a plurality of space segments 90 separated by pillars 100 extending between the outer portion 70 and the inner portion 80, which may provide structural support to the wheel 10. As further shown in FIG. 2, the ring portion 30 may include thereon one or more flanges 110 configured to be received in the space 60. Specifically, as shown in the illustrated embodiment, flanges 110 may be formed as segments separated by gaps 120, wherein the pillars 100 may be received in the gaps 120 such that the flanges 110 are received in associated space segments 90. In other embodiments, a single flange 110 uninterrupted by gaps 120 may be received in the space 60 (e.g., where the space 60 is not separated into space segments 90 by pillars 100.

Figure 3:
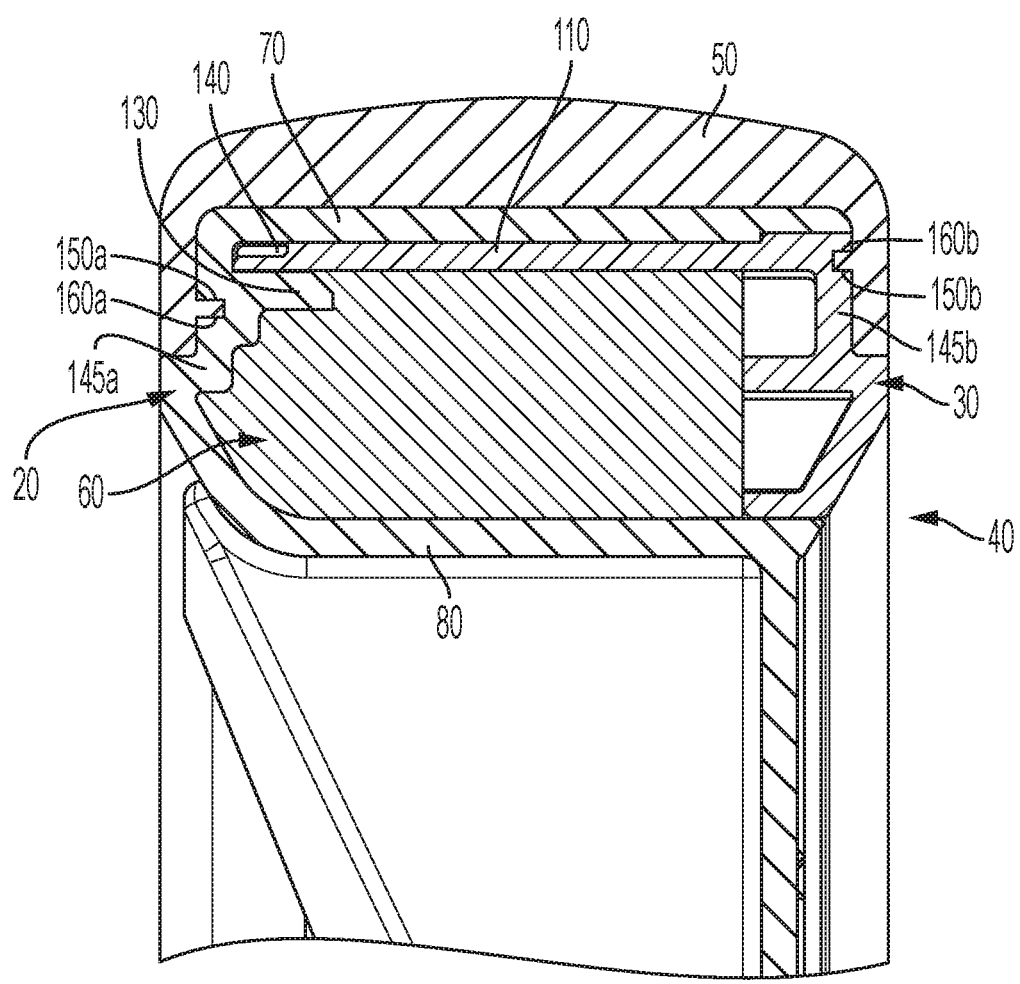
FIG. 3 illustrates a cross sectional view of a portion of the wheel of FIG. 1.
Figure 4:
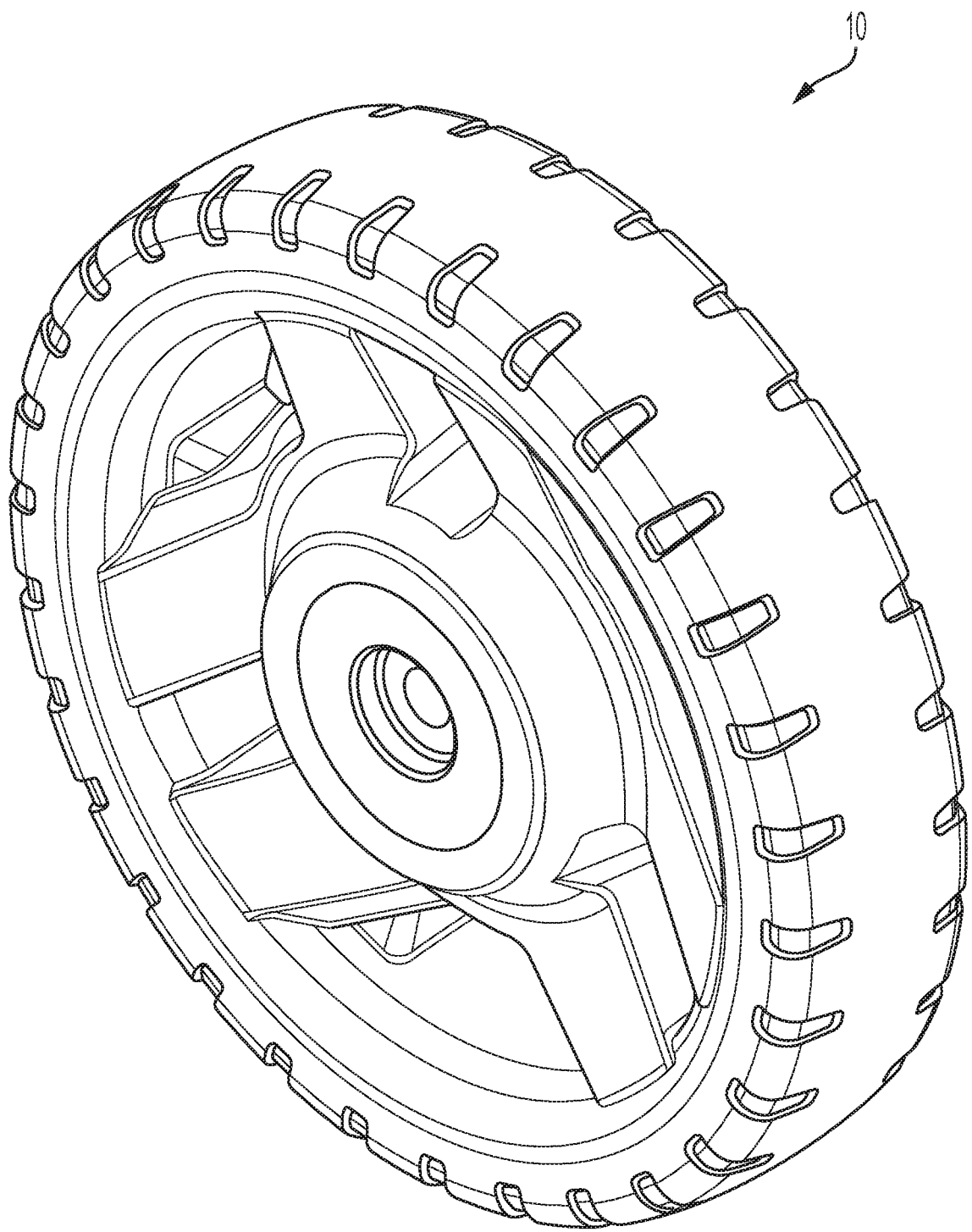
FIG. 4 illustrates a front perspective view of the wheel of FIG. 1 as assembled.
Figure 5:
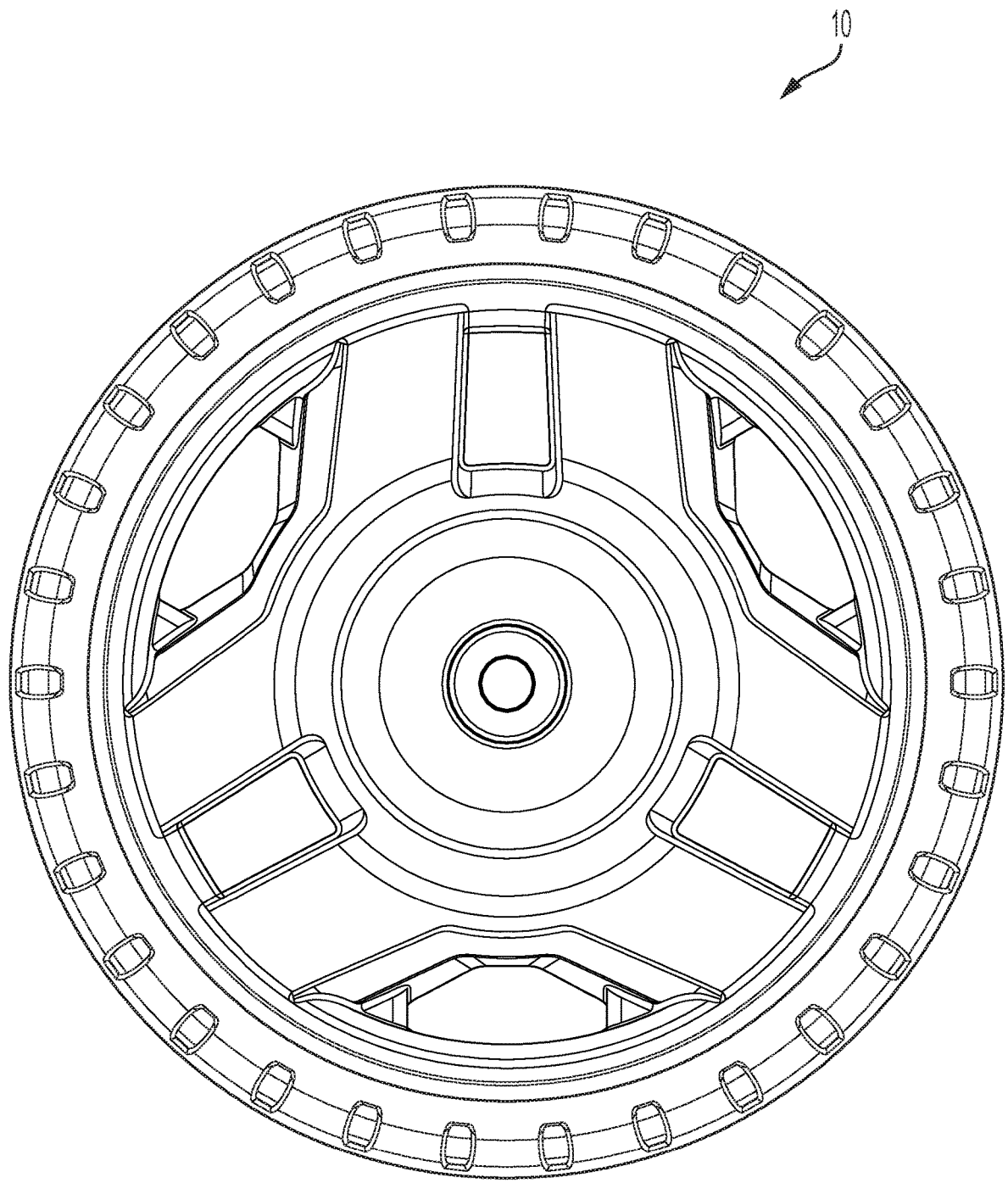
FIG. 5 illustrates a front view of the wheel of FIG. 1.
Figure 6:
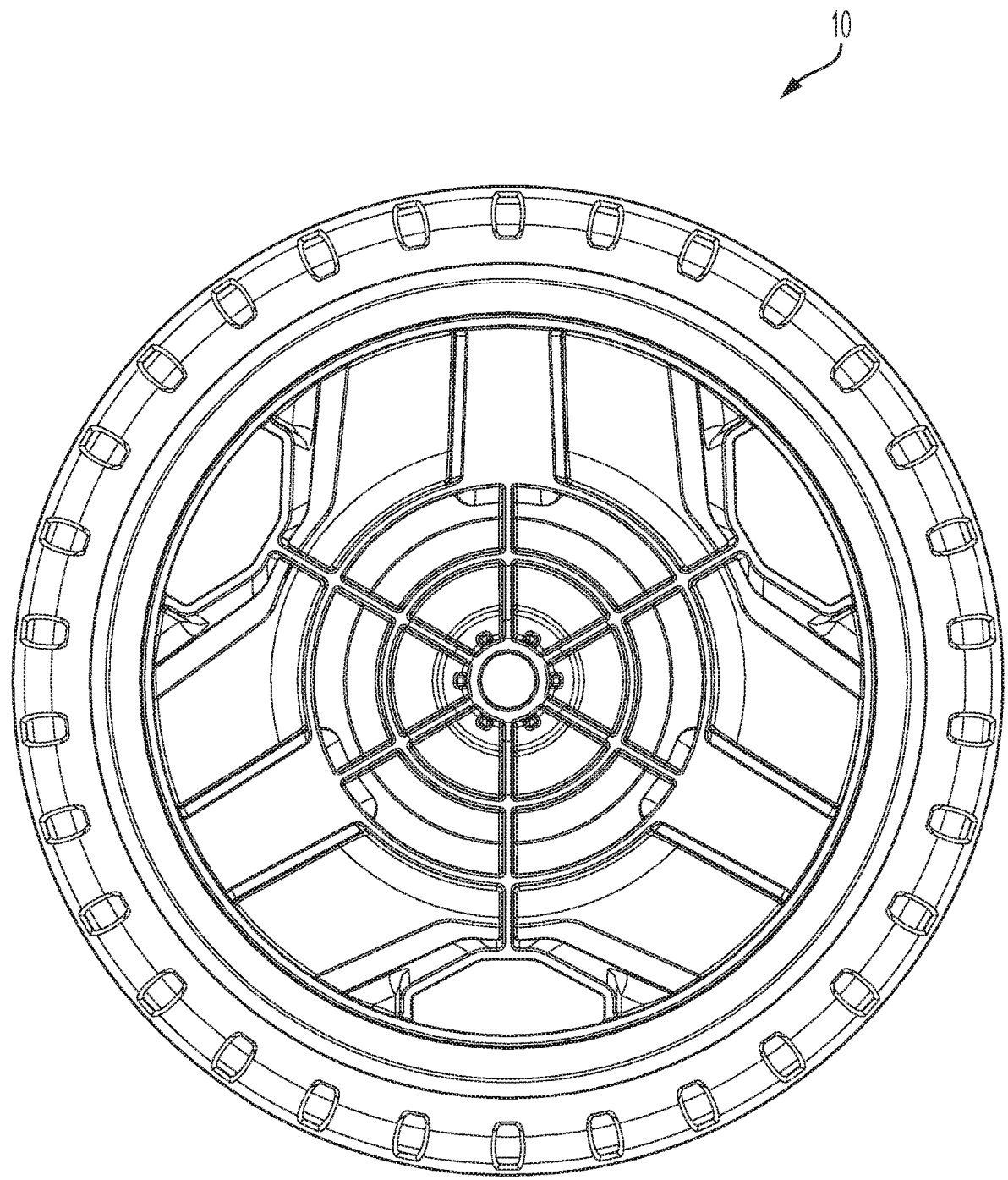
FIG. 6 illustrates a back view of the wheel of FIG. 1.
Figure 7:
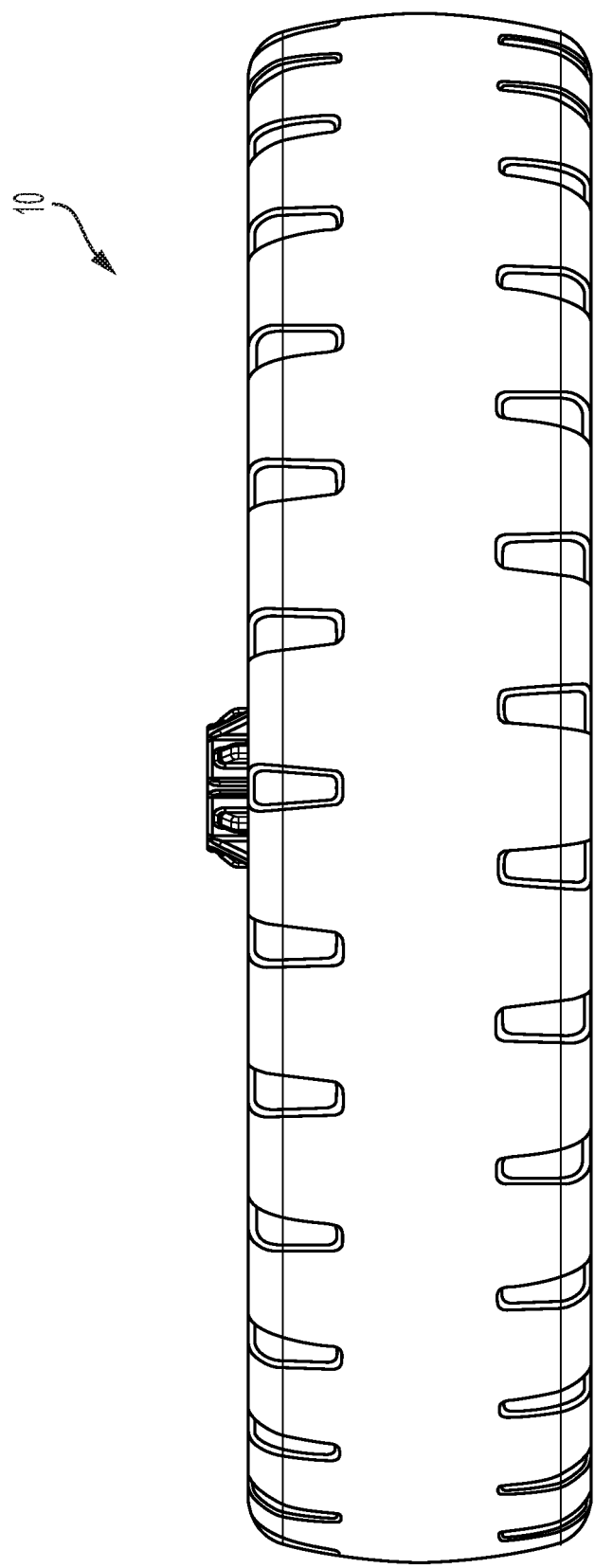
FIG. 7 illustrates a side view of wheel of FIG. 1.

FIG. 3 shows a sectional view illustrating an embodiment of the engagement between the main hub portion 20 and the ring portion 30 as assembled into the assembled hub 40, and as covered by the exterior covering 50. Specifically, as shown, it may be appreciated that the main hub portion 20 may include therein a projection 130 forming a recess 140 in the space 60 into which the flange 110 may be received. As such, the flange 110 may extend axially across space 60 so as terminate substantially adjacent sidewall 145a of hub portion 20 and be supported on the projection 130 when the ring portion 30 is secured onto the main hub portion 20. As shown in FIG. 3, flange 110 extends across at least one third of the axial extent of space 60. As further shown, flange 110 may extend so as to cross a central vertical axis of hub portion 20, that is, the central axis which is perpendicular to the axis of rotation. Accordingly, it may be appreciated that in some embodiments the combination of the outer portion 70 of the main hub portion 20 and the flanges 110 of the ring portion 30, as supported by the projection 130 of the main hub portion 20, may provide sufficient support for subsequent overmolding of the exterior covering 50 over the hollow assembled hub 40 that includes an enclosed void defined by the enclosure of the space 60 by the ring portion 30.

It may be appreciated from the sectional view of FIG. 3 that the outer portion 70 and the inner portion 80 may be spaced from one another on the main hub 20 by a sidewall 145a, while the main body of the ring portion 30 (e.g., that which encloses the space 60 to form the enclosed void(s), may be defined by a sidewall 145b. As shown, in some embodiments one or more of the sidewalls 145a and 145b may have an irregular shape or configuration, which may be shaped to prevent collapse of the space 60, provide structural strength, facilitate molding or other fabrication, or so on.

As further shown in FIG. 3, in an embodiment one or more of the main hub portion 20 and the ring portion 30 may have engagement recesses 150a and 150b (e.g., formed in one or more of the sidewalls 145a and 145b) which may provide additional irregular surfaces into which an overmolded configuration of the exterior covering 50 may engage. In other embodiments, a pre-formed exterior covering 50 may frictionally fit into the engagement recesses 150a and 150b. Regardless of the configuration of the exterior covering 50, it may be appreciated that in some embodiments covering protrusions 160a and 160b formed in the exterior covering 50 may be received in the engagement recesses 150a and 150b of the assembled hub 40 (e.g., in one or more of the main hub portion 20 and the ring portion 30). In some embodiments the engagement between the exterior covering 50 and the engagement recesses 150a and 150b may provide additional frictional fit between the exterior covering 50 and the assembled hub 40, or may deter separation of the exterior covering 50 outward away from an axis of rotation for the assembled hub 40 (e.g., with one side of the exterior covering 50 slipping outward and toward the other side of the exterior covering 50 to separate the exterior covering 50 from the assembled hub 40).

It may be appreciated that in some embodiments, the assembly of the ring portion 30 and the main hub portion 20 may facilitate injection molding or overmolding of the exterior covering 50 (e.g., as a thermoplastic elastomer) over both opposing sidewalls 145a and 145b of the assembled hub 40 without requiring a core (e.g., a metal core) to support the injection mold. It may be appreciated in some embodiments that the assembled hub 40 may itself serve as the core that supports the injection molding of the exterior covering 50 around the exterior perimeter of the assembled hub 40. It may also be appreciated that the injection molding or other application of the exterior covering 50 may further secure the ring portion 30 to the main hub portion 20. In some embodiments where the components of the assembled hub 40 are themselves molded (e.g., molded polypropylene), it may be appreciated that the wheel 10 may be formed by molding the main hub portion 20 and the ring portion 30 separately, assembling the ring portion 30 into the main hub portion 20 to form the assembled hub 40, and the n molding the exterior covering 50 (e.g., injection molded thermoplastic elastomer) onto the assembled hub 40.

As noted above, in some embodiments, the assembled hub 40 may have one or more enclosed voids therein formed by the enclosure of the space 60. Such enclosed voids may therefore be understood as being bounded between a) the combination of the outer portion 70 of the main hub portion 20 and the flange 110 of the ring portion 30 towards the exterior of the assembled hub 40, b) the inner portion 80 of the main hub portion 20 towards the interior of the assembled hub 40, c/d) the opposing sidewalls of the main hub portion 20 and the ring portion 30, and in some embodiments e/f) pairs of the pillars 100 where the space 60 is subdivided into space segments 90 to form separate enclosed voids. In some embodiments one or more of the enclosed voids may be sealed closed as part of the assembly process (e.g., sealed through application of the exterior covering 50 or through application of a separate sealant). In some embodiments, the combination of the exterior covering 50 over the enclosed voids may provide additional resilience of the wheel 10, which may allow the wheel 10 to mimic an air filled tire. In some embodiments, the engagement of the flange 110 supported by the projection 130 extending over the enclosed void may further facilitate compression into the enclosed void. Regardless, it may be appreciated through the various views of the wheel 10 as assembled, as depicted in FIGS. 4-7, may resemble a ruggedized tire without the visible open ended spaces at the external diameters indicative of conventional molded wheel configurations.

It may be appreciated that the main hub portion 20, the ring portion 30, and the exterior covering 50 may each be formed themselves as assemblies in some embodiments. For example, in an embodiment a plurality of subcomponents may form the ring portion 30 that may then be assembled into the main hub portion 20 (which itself may be an integral body or may be an assembly of subcomponents) to form the assembled hub 40. In another embodiment, a plurality of subcomponents form the main hub portion 20 into which either an integral or an assembled ring portion 30 may be assembled therein to form the assembled hub 40. Subassembly components of the wheel 10 may be coupled together by any appropriate mechanism (e.g., via snap fit, friction fit, adhesives, sealants, welds, screws, bolts, rivets, etc.). In an embodiment the components of the wheel 10 may be formed of a uniform construction (e.g., components may be cast, molded, etc.).

It may be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components may be formed of plastic, aluminum (e.g., machined aluminum), iron (e.g., steel), or any other appropriate material. In some embodiments, the material choices may differ from component to component. For example, as described above, in an embodiment, one or more of the main hub portion 20 and the ring portion 30 may be formed of polypropylene, while the exterior covering may be formed by a thermoplastic elastomer. In other embodiments, other materials may be used in any of the components of the assembled hub 40, and/or other materials may be used for the exterior covering 50.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A wheel comprising:
   a hub including a central opening, a radially inner wall disposed at a distance from said central opening and a radially outer wall disposed at a distance from said radially inner wall, said hub having a space defined between said radially inner wall and said radially outer wall;
   a ring engaged to said hub and enclosing the space, said ring including a plurality of flanges disposed in said space between said radially inner wall and said radially outer wall, each of said flanges separated from another of said flanges by a gap; and
   an exterior cover surrounding at least part of said hub and said ring.

2. The wheel of claim 1, further comprising one or more engagement recesses formed on an exterior of one or more of the hub and the ring, the one or more engagement recesses positioned to be covered by the exterior cover when the wheel is assembled.

3. The wheel of claim 1, wherein the exterior cover is overmolded onto an assembly of the hub and the ring.

4. The wheel of claim 3, wherein the exterior cover is formed of a thermoplastic elastomer.

5. The wheel of claim 1, wherein one or more of the hub and the ring are formed of polypropylene.

6. The wheel recited in claim 1, said hub including a plurality of pillars extending radially between said radially inner wall and said radially outer wall, each of said pillars extending into one said gap.

7. The wheel recited in claim 1 further comprising:
   a sidewall extending between said radially inner wall and said radially outer wall; and
   an engagement recess formed in at least one of said sidewall or said ring, said engagement recess covered by said exterior cover.

8. The wheel recited in claim 1, said hub further comprising a plurality of pillars extending between the radially inner wall and the radially outer wall, wherein the gaps surround the pillars when said ring is secured to said hub.

9. A wheel comprising:
   a hub including a sidewall and a radially inner wall and a radially outer wall extending axially from said sidewall, said sidewall, said radially inner wall and said radially outer wall defining a space therebetween;
   a ring engaged to said hub and enclosing the space, said ring including a flange disposed in said space between said radially inner wall and said radially outer wall and extending axially across at least one third of the axial extent of the space towards said sidewall; and
   an exterior cover surrounding at least part of said hub and said ring.

10. The wheel recited in claim 9 further comprising a plurality of said flanges, each of said flanges separated from another of said flanges by a gap.

11. The wheel recited in claim 10, said hub including a plurality of pillars extending radially between said radially inner wall and said radially outer wall, each of said pillars extending in one said gap.

12. The wheel recited in claim 9, further comprising a projection extending axially between said radially inner wall and said radially outer wall.

13. The wheel recited in claim 12, wherein, said flange is disposed radially outwardly of and is supported on said projection.

14. The wheel recited in claim 9, said hub having a rotational axis and a central vertical axis which is perpendicular to the rotational axis, said flange extending at least as far in the direction of the rotational axis so as to cross the central vertical axis.

15. A wheel comprising:
   a hub including a central opening, a radially inner wall disposed at a distance from said central opening and a radially outer wall disposed at a distance from said radially inner wall, said hub having a space defined between said radially inner wall and said radially outer wall and a projection extending axially at a location between said radially inner wall and said radially outer wall;
   a ring engaged to said main hub and enclosing the space, said ring including a flange disposed in the space between said radially inner wall and said radially outer wall, said flange disposed radially outwardly of and supported on said projection; and
   an exterior cover surrounding at least part of said hub and said ring.

16. The wheel recited in claim 15, further comprising one or more engagement recesses formed on an exterior of one or more of the hub and the ring, the one or more engagement recesses positioned to be covered by the exterior cover when the wheel is assembled.

17. The wheel recited in claim 16, wherein the exterior cover is overmolded onto an assembly of the hub and the ring.

* * * * *